United States Patent
Förster et al.

(10) Patent No.: US 6,182,687 B1
(45) Date of Patent: Feb. 6, 2001

(54) PRESSURE-DEPENDENT VALVE FOR A VIBRATION DAMPER

(75) Inventors: Andreas Förster, Schweinfurt; Joachim Kühnel, Dittelbrunn, both of (DE)

(73) Assignee: Mannesmann Sachs AG, Schweinfurt (DE)

( * ) Notice: Under 35 U.S.C. 154(b), the term of this patent shall be extended for 0 days.

(21) Appl. No.: 09/249,665

(22) Filed: Feb. 12, 1999

(30) Foreign Application Priority Data

Feb. 14, 1998 (DE) ............................................... 198 06 129

(51) Int. Cl.[7] .................................................. F16K 17/18
(52) U.S. Cl. .................................. 137/493.8; 188/299.1; 188/322.14
(58) Field of Search ........................... 188/299.1, 322.13, 188/322.14; 137/493

(56) References Cited

U.S. PATENT DOCUMENTS

| 5,301,776 | 4/1994 | Beck | 188/322.13 |
| 5,464,079 | * 11/1995 | Lohberg et al. | 188/315 |

FOREIGN PATENT DOCUMENTS

| 25 04 684 | 8/1976 | (DE) | F15B/13/042 |
| 41 20 122 | 1/1992 | (DE) | B60G/17/08 |
| 41 05 771 | 8/1992 | (DE) | B60G/17/08 |
| 44 01 393 | 4/1995 | (DE) | B60G/17/08 |
| 44 24 437 | 8/1995 | (DE) | F16F/9/32 |

* cited by examiner

Primary Examiner—Stephen M. Hepperle
(74) Attorney, Agent, or Firm—Cohen, Pontani, Lieberman & Pavane (57) ABSTRACT

A pressure-dependent valve, for use with an adjustable vibration damper comprising a piston rod arranged in an axially movable fashion in a cylindrical tube filled with damping fluid, is controlled by a pressure transducer pressurized via a pressure connection opening. The pressure-dependent valve includes a valve body axially movable relative to a valve surface. The valve body and valve surface together determine a valve passage cross-section. The pressure transducer is float-mounted in a pressure space and supported by at least one spring. One of the valve parts determining the valve passage cross-section is movable relative to the current position of the pressure transducer by an adjustment device.

13 Claims, 8 Drawing Sheets

PRESSURE-DEPENDENT VALVE FOR A VIBRATION DAMPER

BACKGROUND OF THE INVENTION

1. Field of the Invention

The invention relates to a pressure-dependent valve for use with a vibration damper having a piston rod axially movably arranged in a fluid-filled cylindrical tube, the pressure-dependent valve being activated by an adjustment device that is pressurized via a pressure connection opening.

2. Description of the Related Art

A prior art pressure-dependent valve for an adjustable vibration damper is disclosed in German reference DE 44 01 393 C1. The adjustable vibration damper includes a piston rod axially movably mounted in a cylindrical tube filled with damping fluid. The cylindrical tube has a connection to the pressure-dependent valve, which is activated by a pressurized adjustment device. The adjustment device has an axially movable valve body that is activated by a pressure transducer, which is float-mounted in a pressure space and supported by at least one spring. The spring that prestresses the pressure transducer determines the steepness of an opening force characteristic curve of the valve in the case of given valve cross-sections. It is disadvantageous in that the prior art uses cup springs which are subject to significant fluctuations with respect to their spring force. The slightest deviations in the dimensions of the cup springs have considerable influence on valve behavior.

Furthermore, the ability to set an operating point at any location on the opening force characteristic curve of the valve is a desired characteristic. However, this is not possible with the prior art valves shown by the reference DE 44 01 393 C1.

SUMMARY OF THE INVENTION

The object of the present invention is to provide a pressure-dependent valve in such a way that it is possible to set a valve opening force characteristic curve and to set an operating point of the valve at any desired point on the force characteristic curve.

According to the invention, this object is met by a pressure-dependent valve having an adjustment device including a valve body and a valve surface that are movable relative to each other for determining a valve cross section. The valve body is connected to a float-mounted pressure transducer and either the valve body or the valve surface is movable relative to the current position of the pressure transducer by the adjustment device. The essential advantage compared with the prior art is that the valve passage cross-section is adjustable independently of the position and prestress of the pressure transducer. In the prior art, a closed stress chain always existed from the pressure transducer to the valve surface. Therefore, in the prior art, increased prestress of the pressure transducer was always associated with a closed valve in the prior art device. When cup springs are used to prestress the transducer, there is frequently a need to readjust the spring prestress force. With the adjustment device of the present invention, the requirement that the valve be closed to increase the spring prestress force of the pressure transducer and the valve passage cross-section is eliminated, so that, at a specific prestress force of the pressure transducer on the valve body, either an open or a closed valve passage cross-section is possible.

With respect to the valve performance characteristics, the adjustment of the spring prestress of the pressure transducer in the present invention permits the production of different force characteristic curves having different slopes, i.e., different force gradients. After the force characteristic curve is set, the adjustment device is used to set an operating point on the force characteristic curves at which, for example, the valve opens.

In one embodiment, the valve body is axially adjustable relative to the pressure transducer by the adjustment device. Alternatively, the valve surface can be adjustable relative to the pressure transducer by the adjustment device. One criterion in deciding for or against one of the two variants may be whether and with what mechanism the valve is adjusted, whereby the component to be adjusted should be as easily accessible as possible.

The adjustment device should, if possible, perform two functions. First, the described movement of the valve body or the valve surface must be ensured. Secondly, holding forces, which counteract operating forces in the valve, must be absorbed. Therefore, in one embodiment, the adjustment device may comprise a threaded joint which may, for example, at least indirectly connect the pressure transducer to the valve body.

In another embodiment, the pressure transducer has a blind hold threaded opening to partially accommodate the valve body. The blind hole threaded opening is part of the adjustment device. This solution is especially suitable when the valve body, for setting purposes, is accessible from the direction of the valve surface. In this embodiment, it is not necessary to seal the valve body relative to the pressure transducer because no passage opening for the valve body exists.

In yet a further embodiment, the pressure transducer has an opening through which an extension of the valve body runs to the side of the pressure transducer facing away from the valve body. In this embodiment, the adjustment device which movably holds the valve body relative to the pressure transducer is arranged between the extension and the pressure transducer. The valve body is thus radially guided especially well. Furthermore, the rear side of the valve body is generally easier to reach when the valve body is pressurized during the setting process, for example, by a pressure medium, and a certain tightness of the measurement device relative to the valve is required. The setting process is especially simple when the extension is arranged centrally relative to the pressure connection opening in a lid of the pressure-dependent valve, so that the extension is accessible through the pressure connection opening.

In all embodiments, it is desirable for the valve part movable by the adjustment device to have at least one tool surface.

However, an embodiment may also be realized in which the valve surface comprises a screw socket inside a pot-shaped piece. The screw socket may be turned as required to change the position of the valve surface.

Even when the threaded joint of the adjustment device comprises an attachment thread, the axial thread clearance must be taken into account because the valve passage cross-sections are quire small and the small axial thread clearance therefore influences the valve passage cross-section. For this reason, the threaded joint has a thread clearance compensation means. Thread clearance compensation may be implemented, for example, by the movable valve part being rolled or welded to a stationary part. However, because the entire valve is very small in structure, such work steps, under some circumstances, may damage the valve.

In a preferred embodiment, the thread clearance compensation means may comprise a prestress spring acting on the valve part movable relative to the pressure transducer so that the same threaded flank sides always lie atop one another. The prestress spring presents a flank change as a result of fluctuating pressures on the valve body due to the thread clearance.

For further precision setting of the valve, the pressure transducer is held bilaterally by spring elements on support surfaces, at least one of which is axially adjustable. As a result, the prestress of the spring elements acting on the pressure transducer is adjustable. Depending on the prestress, it is possible for the resulting spring forces of the springs acting on the pressure transducer to act in the opening or in the closing direction. In addition, an equilibrium of forces can be established. This has proved especially advantageous when flat spring disks are used as the spring element instead of cup springs. The screening influence that exists in the case of cup springs is eliminated.

To permit a simple setting operation, the axially movable support surface comprises a support ring movably mounted in the pressure space. For economical but reliable attachment of the support ring, the support ring establishes a press fit with a guide inside the pressure spaced. The press fit is relatively easy to implement because the maximum operating forces on the support ring are known. If the oversize of the press fit is embodied skillfully, the support ring can be precisely adjusted in a measurement device, for example, in that a plunger acts on the support ring and, after measurement of the spring force on the pressure transducer, can be removed. The friction forces created in the press fit between the support ring and the guide act against the support forces of the spring elements. The spring elements can be set progressively, whereby no threaded joint is necessary between the support ring and the guide for the support ring.

If the pressure-dependent valve is used with a pneumatic spring of a motor vehicle whose operating pressure acts on the pressure transducer, then a relatively large pneumatic volume in the pneumatic spring coexists with a relatively small volume in the pressure space of the valve. Upon a springing movement of the pneumatic spring, the pneumatic volume is compressed, then relieved. These oscillatory movements are transmitted to the pressure transducer of the pressure-dependent valve. To filter out the operating pressure as a function of load independently of the springing movements during vehicle travel, the pressure space has a pressure connection opening in which a throttle is arranged. This throttle flattens the fluctuations of the operating pressure on the pressure transducer. A further advantage is that, upon rebound movements by the vehicle, the pneumatic spring necessarily becomes more relaxed which reduces the pressure on the pressure transducer. In the embodiment of a pressure-dependent valve is a vibration damper, this reduction of pressure on the pressure transducer would be associated with a simultaneous reduction in damping force if the throttle is not able to briefly hold the pressure in the pressure space. This fulfills the objective of providing the greatest possible damping in the tensile stage, in particular, when a greater damping effect is desirable.

The effect of a throttle depends on the length, cross-section and curve of the throttle distance. These requirements are effectively met in a simple fashion when the throttle comprises an internal thread into which a screw piece is screwed. In this embodiment, the thread clearance between the internal thread and the screw piece thread forms a throttle distance. The thread clearance represents the cross-section of the throttle, the unwinding of the thread is the throttle length, and the screw shape is the curve. All three parameters may be fulfilled to a great extent by one thread so that the throttle effect is satisfactory.

In yet another embodiment, the extension through the pressure transducer projects into the pressure connection opening. This provides several advantages. For example, the accessibility of the extension for the setting procedure is improved. Moreover, given suitable design of the cross-sections, a radial guide of the extension is attained from the pressure connection opening to the extension. In addition, a narrow gap between the extension and the pressure connection opening may also be used as a throttle.

Furthermore, the extension may have a throttle inlet channel from the pressure connection opening to the pressure space. There is thus no longer any relationship between the guide and the throttle at the gap. Not all throttle designs are acceptable. Certain calculated relationships must be maintained, which, in some circumstances, do not permit a guide of the extension at this point.

To obtain an especially long throttle inlet channel, the throttle inlet channel in the extension opens in the threaded joint, which already acts as a throttle between the pressure transducer and the extension.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
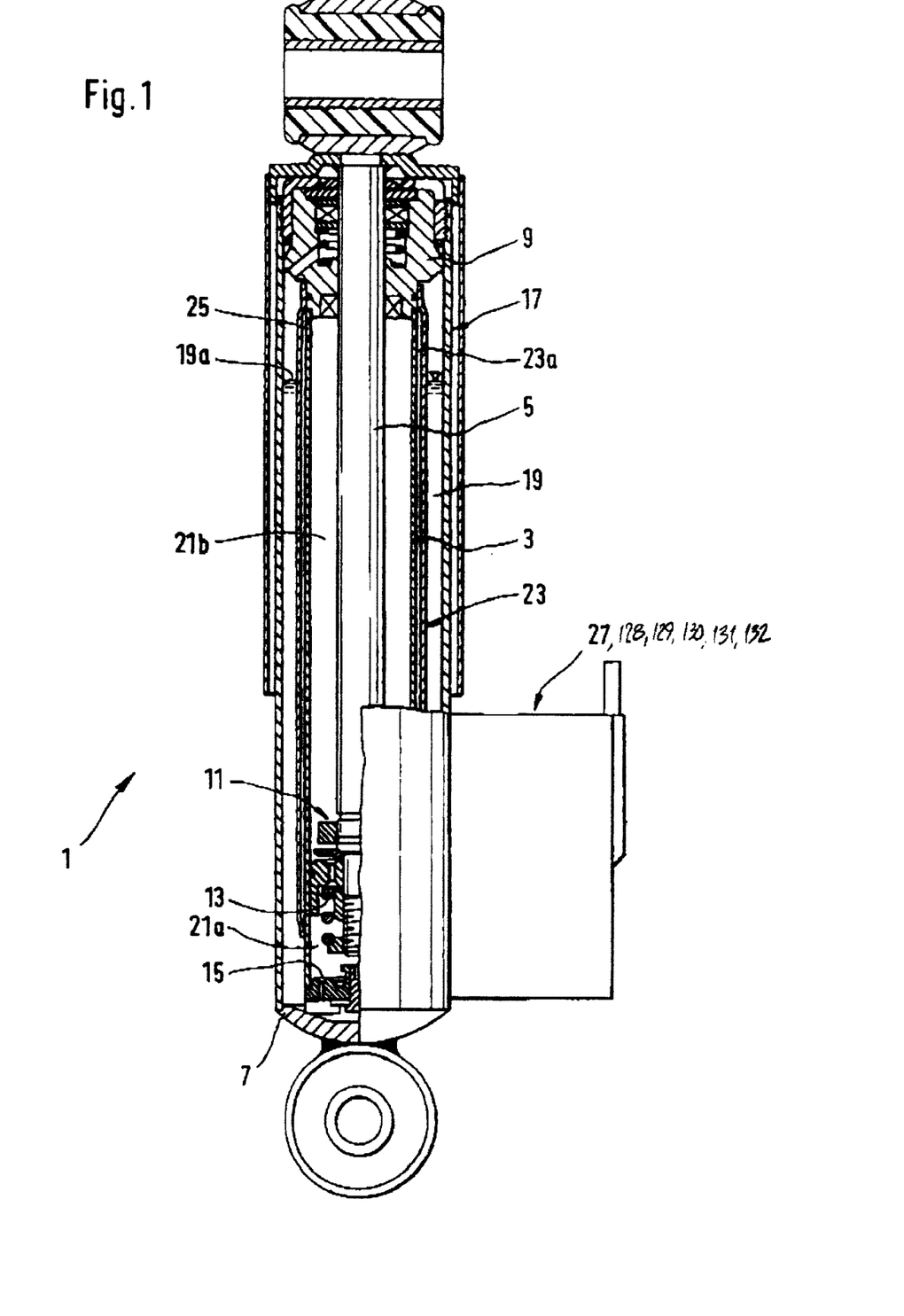
FIG. 1 is a partial sectional longitudinal view of a vibration damper with a pressure-dependent valve according to an embodiment of the present invention.

FIG. 1 shows a vibration damper 1 according to an embodiment of the invention with a cylinder 3 and a piston rod 5 axially movably arranged therein. The bottom end of the cylinder 3 is closed by a bottom 7. The piston rod 5 extends out from the upper end of the cylinder 3 through a guide and sealing unit 9. A piston unit 11 with a piston valve arrangement 13 is attached to the piston rod 5 inside the cylinder 3. The bottom 7 of the cylinder 3 is equipped with a bottom valve arrangement 15. The cylinder 3 is surrounded by a container tube 17. A compensation chamber 19 comprises an annular space between the container tube 17 and the cylinder 1. The space inside the cylinder 3 is divided by the piston unit 11 into a first working chamber 21a and a second working chamber 21b. The working chambers 21a and 21b are filled with a pressure fluid. The compensation chamber 19 is filled with fluid to level 19a with gas above that. An intermediate tube 23 inside the compensation chamber 19 defines a first conduit section, namely, a high-pressure segment 23a, which is connected via a boring 25 through the cylinder 3 to the second working chamber 21b. A pressure-dependent valve 27 attached to the high-pressure segment 23a is mounted laterally on the container tube 17. A second conduit section, namely, a low pressure segment leads from the pressure-dependent valve 27 to the compensation space 19.

In FIG. 1, the piston rod 5 is shown in its fully inserted position. When the piston rod 5 moves upward from the cylinder 3, the upper working chamber 21b reduces in size. During the upward motion of the piston rod 5, an overpressure forms in the upper working chamber 21b which dissipates into the lower working chamber 21a via the piston valve arrangement 13 as long as the pressure-dependent valve 27 is closed. When the pressure-dependent valve 27 is open, fluid also flows from the upper working chamber 21b through both the high-pressure segment 23a and the pressure-dependent valve 27 into the compensation chamber 19. The damping characteristic of the vibration damper 1 during an excursion of the piston rod 5 is thus dependent on whether the pressure-dependent valve 27 is open or closed.

When the piston rod 5 moves into the cylinder 3, an overpressure forms in the lower working chamber 21a. Fluid passes from the lower working chamber 21a upward via the piston valve arrangement 13 into the upper working chamber 21b. The fluid displaced by the increasing piston rod volume in the cylinder 3 is expelled via the bottom valve arrangement 15 into the compensation chamber 19. Because the flow resistance of the piston valve arrangement 13 is lower than the flow resistance of the bottom valve arrangement 15, pressure also rises in the upper working chamber 21b. When the pressure-dependent valve 27 is open, this rising pressure can again overflow through the high-pressure segment 23a into the compensation space 19. This means that during inward movement, the shock damper 1 has a softer characteristic when the pressure-dependent valve 27 is open and a harder characteristic when the pressure-dependent valve 27 is closed, just as during excursion of the piston rod 5. The flow direction through the high-pressure segment 23a of the bypass always remains the same, regardless of whether the piston rod 5 is moving into or out of the cylinder 3.

Figure 2:
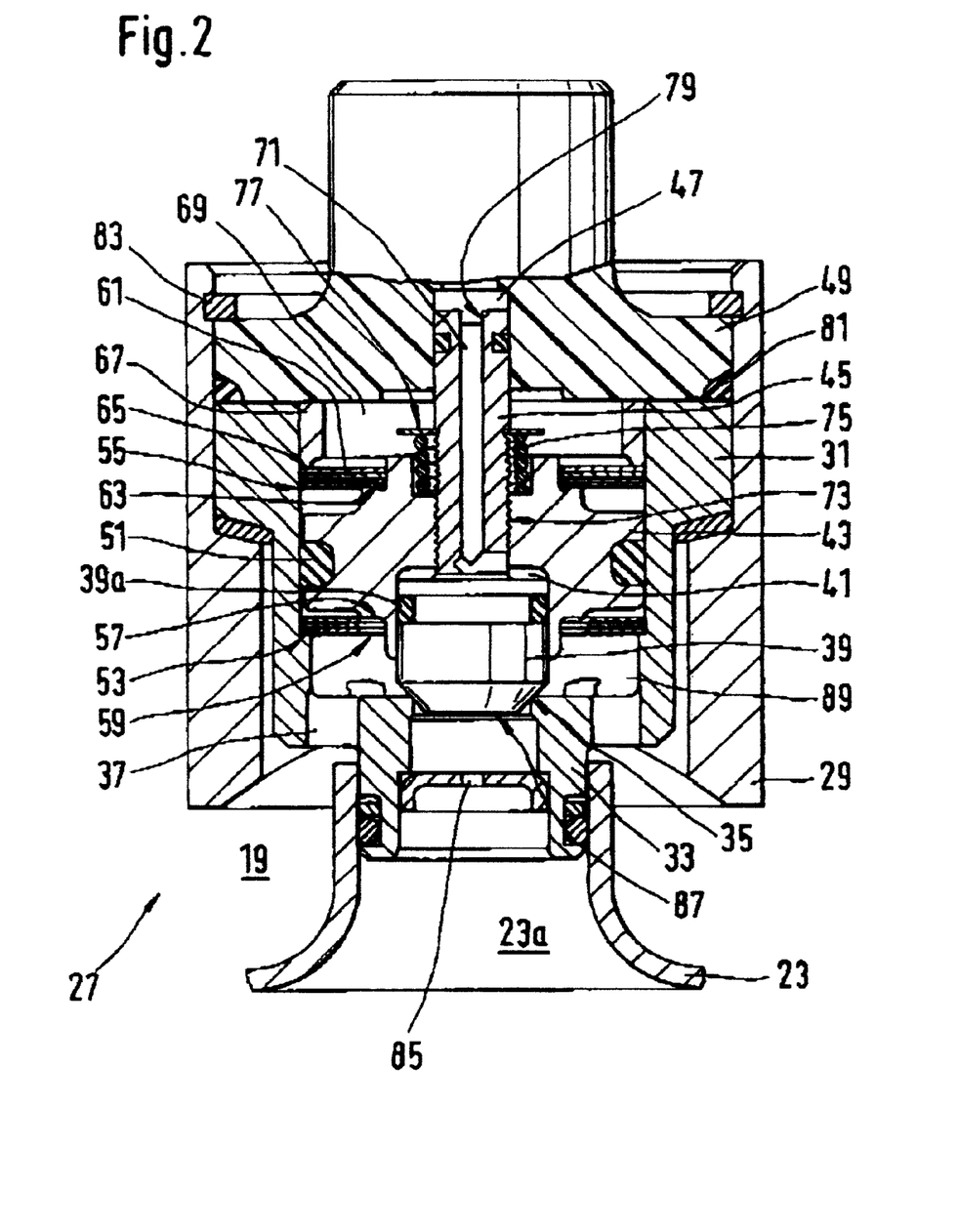
FIG. 2 shows an embodiment of the pressure dependent valve of FIG. 1 according to the present invention.

FIG. 2 shows an embodiment of the pressure-dependent valve 27 including a pipe socket 29 arranged externally on the container tube 17. The pipe socket 29 includes a pot-shaped insert 31 with a connection 33 to the high-pressure segment 23a of the vibration damper 1. The connection 33 is effected through a hole in the intermediate tube 23. A valve surface 35 and at least one discharge opening 37 for communicating with the compensation space 19 are worked into the bottom of the pot-shaped insert 31.

In the operating position shown in FIG. 2, a valve body 39 is prestressed on the valve surface 35. The valve body 39 is run radially, relative to the vibration damper 1, through a central step opening 41 of a pressure transducer 43. A valve body seal 39a separates the front side of the valve body 39 which faces toward the vibration damper 1 from the rear side of the valve body 39 which faces away from the vibration damper 1. An extension 45 is attached to the valve body 39 which extends completely through the pressure transducer 43 and ends in a pressure connection opening 47 in a cover 49. The pressure connection opening 47 is connected to a pressure source (not shown) such, for example, as a pneumatic spring.

The pressure in the pressure connection opening 47, hereinafter called the control pressure, acts on the pressure transducer 43, which runs in an axially floating fashion in the pot-shaped insert 31. The pressure transducer 43 includes a disk portion with a seal 51 on its external diameter. The internal diameter of the tube-shaped insert 31, starting from the cover 49 to a first support surface 53, comprises a guide surface 55 for the seal 51.

A first spring element 59 is arranged radially outside on the first support surface 53 and is set on a shoulder 57 on the lower side of the pressure transducer 43. The first spring element 59 preferably comprises layered flat disks. A second spring element 61 is held between a further shoulder 63 of the pressure transducer 43 and a second support surface 65. The second support surface 65 is provided by a clamping ring 67, whose external diameter relative to the guide surface 55 is such that a press fit exists between these surfaces.

The seal 51, the guide surface 55, the upper side of the pressure transducer 43, and the cover 49 form a pressure space 69 in which the control pressure is applied. The control medium does not make its way directly from the pressure connection opening 47 into the pressure space 69 because the extension 45 is sealed externally relative to the pressure connection opening 47. The extension has a central throttle inlet channel 71, which reaches a position proximate to the valve body 39. From there, the pressure medium flows through the slight gap between the pressure transducer 43 and the extension 45 through a threaded joint which forms an adjustment device 73 to the pressure space 69. The threaded joint represents a continuation of the throttle inlet channel 71.

So that the adjustment device 73 or threaded joint functions without play, a prestress spring 75 is arranged between the extension 45 and the upper side of the pressure transducer 43. The prestress spring 75 prestresses the two aforementioned parts of the threaded joint such that the same threaded flanks are always in engagement. A support disk 77 is arranged on the extension 45 as a stop for the prestress spring 75.

During assembly, the valve body 39 with its extension 45 is first screwed into the step opening to or near to the stop 77. After this, the seal 51 is inserted onto the pressure transducer 43. A number of flat disks for the first spring element 59 are placed on the first support surface 53 in the pot-shaped insert 31. Then, the pressure transducer 43 with the seal 51 and the valve body 39 is placed into the pot-shaped insert 31. In a further work step, the second spring element 61 is placed onto the shoulder 63 of the pressure transducer 43. The subassembly prepared in this way is clamped into a device that applies a periodically pulsating force to the valve body 39 from below. The force can be introduced mechanically by a tappet, or hydraulically or pneumatically by a pressure medium.

For a particular valve setting, a defined opening force is to be applied to the valve body 39. The clamping ring 67 is inserted for pressing the pressure transducer 43 down via the second spring element 61. If the planned force gradient is achieved on the pressure transducer 43, the means to introduce force to the valve body 39 and the pressure transducer 43 are taken out of operation. The spring elements 59 and 61 are thus set to a planned spring rate. The clamping ring 67, due to its press fit with the guide surface 55, holds the set position of the spring elements. Tolerances for the spring elements, the shoulders on the pressure transducer 43, etc. are compensated for by this adjustment.

After this, the prestress spring 75 must be assembled with the support disk 77. In a further work step, the position of the valve body 39 relative to the pressure transducer 43 is determined by the adjustment device 73 to establish a valve passage cross-section between the valve body 39 and the valve surface 35. It is possible for a valve passage cross-section to have already been provided. Alternatively, the valve body 39 may be positioned so that it rests without force on the valve surface 35 in the open direction or the valve body 39 may be positioned relative to the pressure transducer so that a prestress may be exerted on the valve body 39 by an adjustment movement in which the valve body 39 is rotated out from the pressure transducer 43. For the adjustment movement, the extension 45 has at least one tool surface 79 at its end. With the adjustment device 73, an operating point can be set on the force characteristic curve of the pressure transducer 43.

Figure 3:
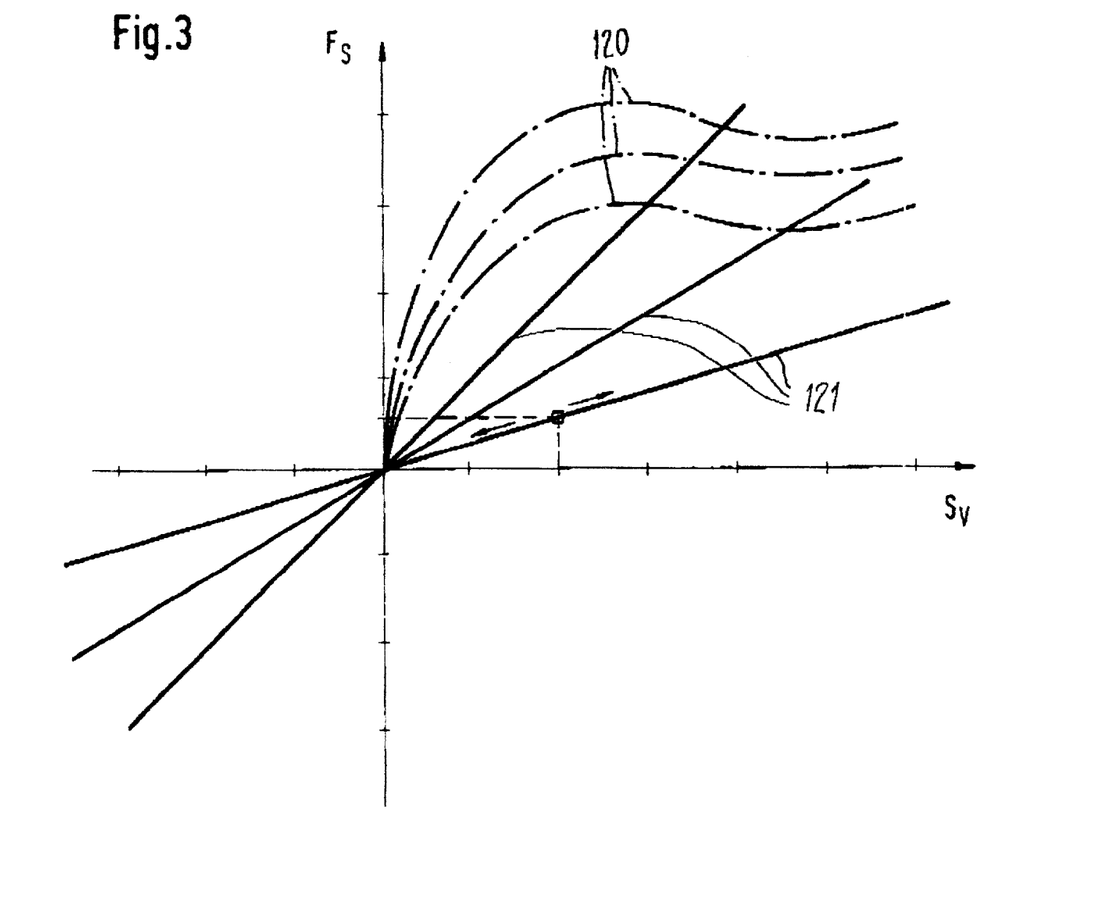
FIG. 3 shows the force characteristic curve of the pressure-dependent valve of FIG. 1.

FIG. 3 illustrates how the invention differs from the prior art. The curves 120 shown in dashed-dotted lines represent typical spring characteristics of three different cup springs. There is a necessary connection between the spring force and the valve passage cross-section or the path s, of the valve body 39. Thus, only the dashed-dotted curves are attainable, and even these are highly subject to tolerances.

In the present invention, the different prestresses of the first and second spring elements allow different slopes to be attained in the case of the closing forces $F_s$. The adjustment device 73 permits movement of the operating point, e.g., the opening point of the valve body 39 from the valve surface 35, to a position on a straight line 121 of the characteristic curve field. Since the springs 59, 61 are prestressed, it is possible to set an operating point in the third quadrant of the characteristic field, at which the valve body 39 is lifted from the valve surface 35 by the spring elements 59, 61 even without force being introduced to the valve body 39. The closing forces $F_s$, constitute the resulting forces that act on the pressure transducer 43, namely, the control force acting in the closing direction in the pressure space 69, and the prestress force of the second spring element 61 minus the opening force of the first spring element 59. The horizontal axis of the force diagram represents the path of the pressure transducer 43/valve body 39. The zero point marks the state in which the valve body 39 rests on the valve surface 35 without any closing force.

Referring again to FIG. 2, when the force setting operations for determining the force characteristic curve are completed, the pot-shaped insert 31 is introduced into the pipe socket 29. Then the cover 49 with the external cover seal 81 is moved into the pipe socket 29, until the cover 49 rests frontally on the pot-shaped insert 31. The cover seal 81 seals the pressure space 69 and the compensation space 19 relative to their surroundings in the area of the pressure-dependent valve 27. A safety ring 83 holds the cover 49 in a closed position. The cover 49 can be rotated to allow a supply line (not shown) to be oriented in a desired position relative to the pressure-dependent valve 27.

During operation of vibration damper 1, damping fluid is displaced via the high-pressure segment 23a into the connection 33 of the valve 27. Depending on the desired damping force characteristic curve, the damping medium may have to pass a pre-throttle 85 before striking a flow surface 87 of the valve body 39. The pressure on the flow surface 87, multiplied by its area, represents an opening force that acts on the valve body 39 and counteracts the closing force on the pressure transducer 43 resulting from the control pressure in the pressure space 69 and the spring force of the two spring elements 59, 61. If the opening force is greater than the closing force, the valve body 39 lifts up, or an open valve body, which already permits a valve passage cross-section in the pressure-free state, lifts up farther. The damping medium flows from a low-pressure space 89 into the compensation space 19 between the bottom of the pot-shaped insert 31 and the lower side of the pressure transducer 43.

It should also be mentioned that when the piston rod 5 is stationary with respect to the cylinder 3, the current pressure in the vibration damper 1 acts on an area the size of the lower side of the pressure transducer 43 plus the flow surface 87 of the valve body 39, and constitutes an opening force particularly in the case of vibration dampers with a gas prestress in the compensation space, this circumstance must be taken into account in setting the spring elements, because upon heating, e.g., due to damping operation, the gas prestress may rise and enlarge the valve passage cross-section thereby lowering the damping force.

Figure 4:
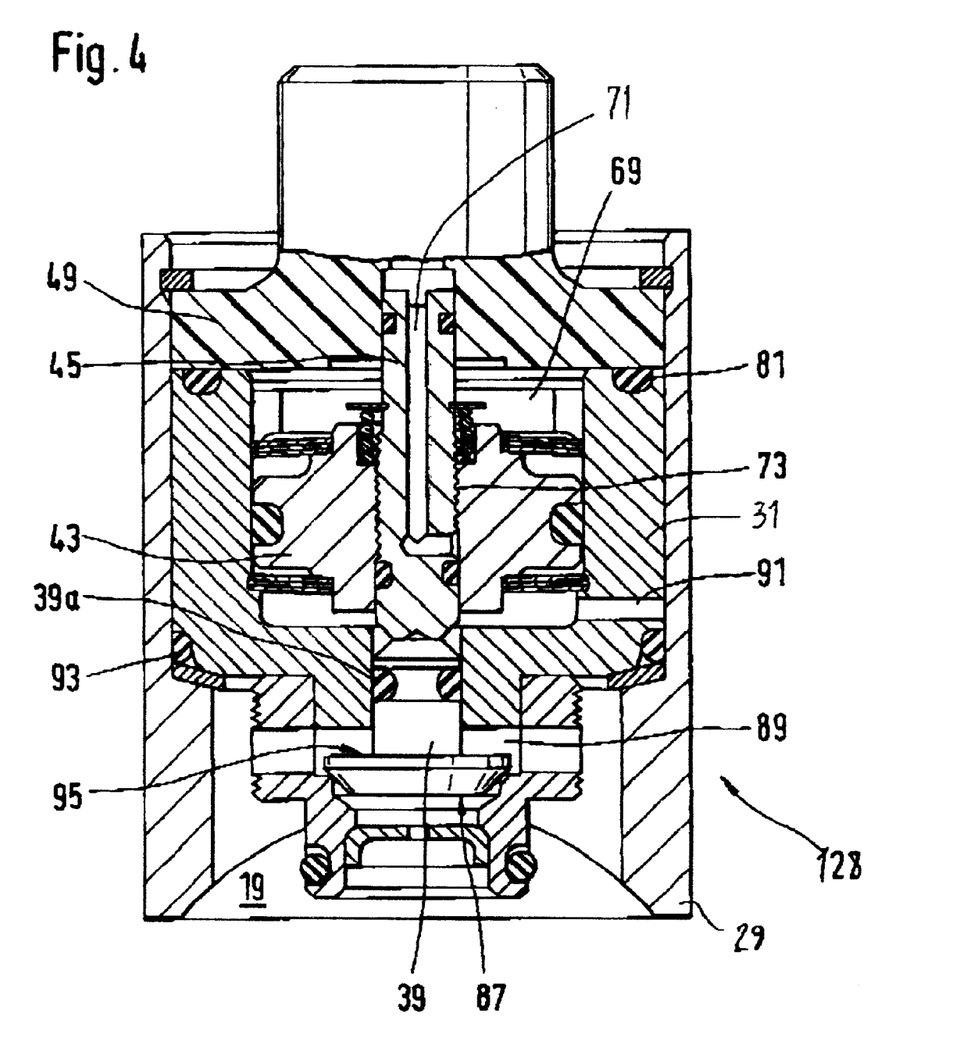
FIGS. 4–8 each show a further embodiment of the pressure dependent valve of FIG. 1 according to the present invention.

FIG. 4 shows another embodiment of a pressure-dependent valve 128. The basic structure of the pressure-dependent valve 128 of FIG. 4 corresponds to the pressure-dependent valve 27 in FIG. 2. The action of the pressure-dependent valve 128 is the same as pressure-dependent valve 27, so that only the differences between them will be discussed. In FIG. 4, the extension 45 of the valve body 39 is a separate component in the manner of a valve tappet. The lower side of the pressure transducer 43 is hydraulically separated from the low pressure space 87 by the valve body seal 39a but is connected to atmospheric pressure via a ventilation connection 91 in the pot-shaped insert 31. The dual functions of the cover seal 81, i.e., sealing the pressure space 69 and the compensation space 19, are divided. Instead of being arranged on the lower outer edge of the cover 49, the cover seal 81 in FIG. 4 is located approximately in the center of the front of the pot-shaped insert 31, so that the cover seal seals only the pressure space 69. A separate pipe socket seal 93 is used to seal the compensation space 19 from the pressure space 69. The ventilation connection 91 is located between the cover seal 81 and the pipe socket seal 93. Thus, there is a large enough cross-section available between the inner wall of the pipe socket 29 and the outer wall of the pot-shaped insert 31 for the aeration and de-aeration of the space between the lower side of the pressure transducer 43 and the bottom of the pot-shaped insert 31. During operation, the valve body 39 is pressed against the extension 45 by the pressure in the pressure-dependent valve 128 and thereby, follows the movement of the extension 45.

The essential advantage of the illustrated difference in FIG. 4 is that the stationary pressure in the vibration damper 1, due to the gas prestress in the compensation space 19, exerts a substantially smaller influence on the opening force acting on the valve body 39. Although the stationary pressure acts on the flow surface 87 of the valve body, it also acts simultaneously on a valve body rear side 95, so that only the differential area left from the flow surface minus the valve body rear side remains ad the active surface for the stationary pressure. Given a corresponding size difference between the pressurized area in the pressure space for the pressure transducer and the pressurized areas on the valve body, the influence of the stationary pressure is negligible. It must taken into account that the current operating pressure during the piston rod movement is superimposed on the effect of the stationary pressure.

Figure 5:
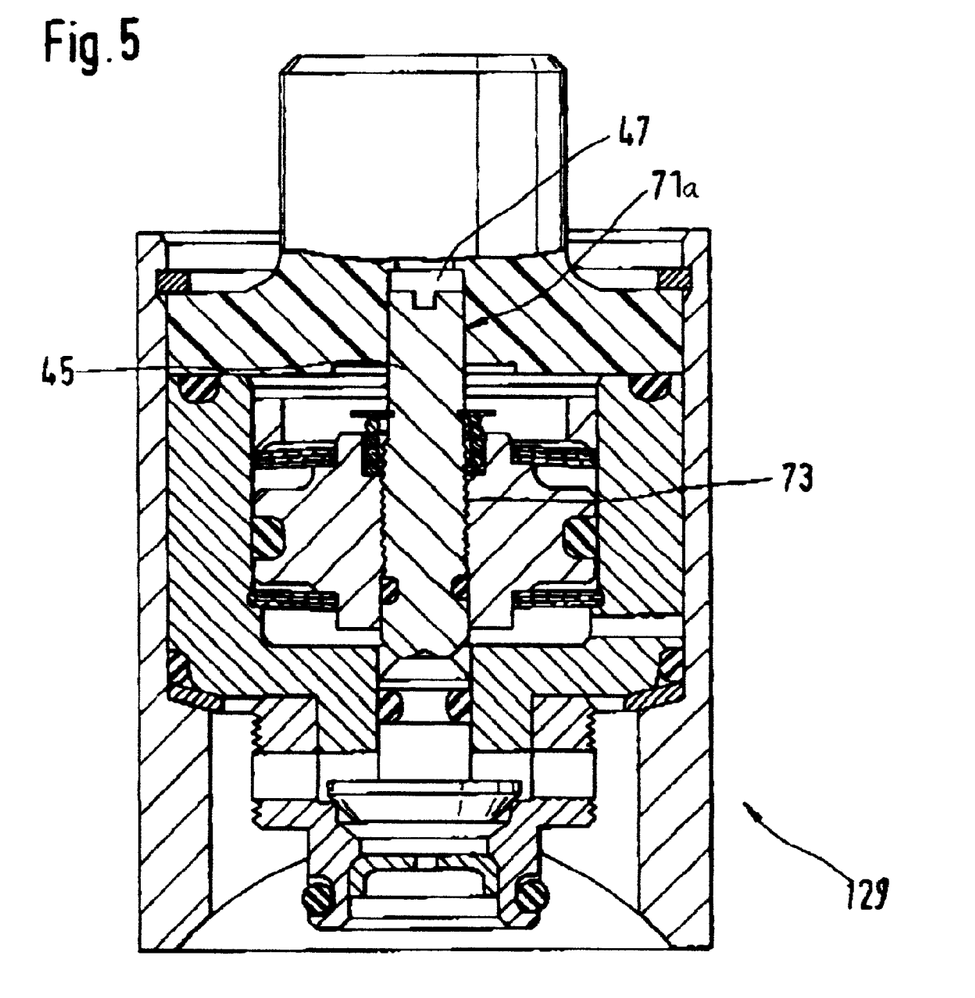

FIG. 5 shows an embodiment of a pressure-dependent valve 129 that is identical to the pressure-dependent valve 128 of FIG. 4 except for the throttle inlet channel. In FIG. 5, the throttle channel 71a is an annular gap between the pressure connection opening 47 and the extension 45 extending into the pressure connection opening. A seal in the extension is dispensed with, as is the additional central boring in the extension. The decision as to which of the two throttle channels 71, 71a can be used depends on the required throttle cross-section for a particular application.

Figure 6:
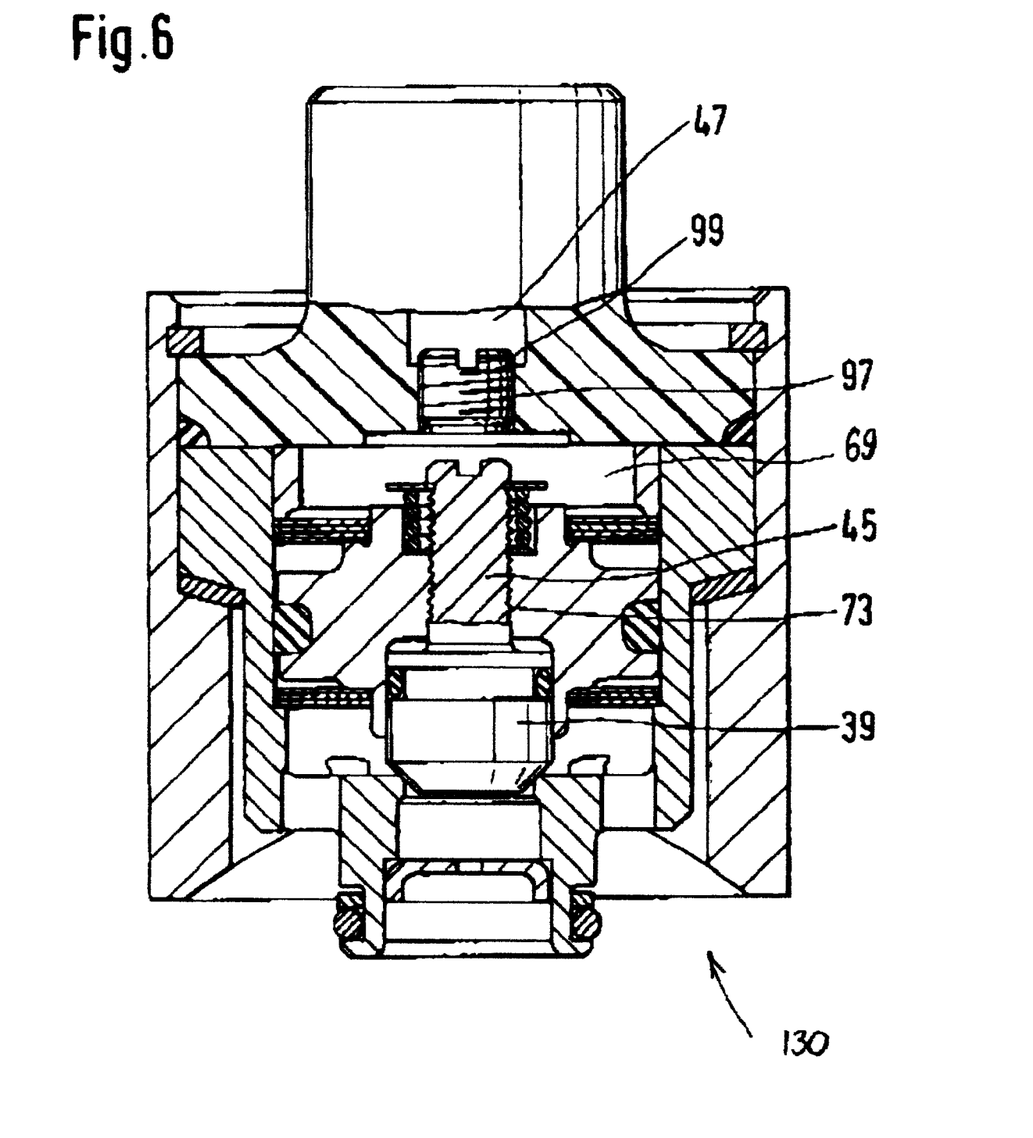

FIG. 6 shows an embodiment of a pressure-dependent valve 130 that is different from the pressure-dependent valve 27 of FIG. 2 in that the extension 45 of the valve body 39 in FIG. 6 does not extend into the connection opening 47. The connection opening 47 in this embodiment has an internal thread 97 into which a screw piece 99 threadably engages. The thread clearance between the internal thread and the screw piece corresponds to the threaded joint of the adjustment device in FIG. 2 and therefore acts as a throttle between the connection opening 47 and the pressure space 69.

Figure 7:
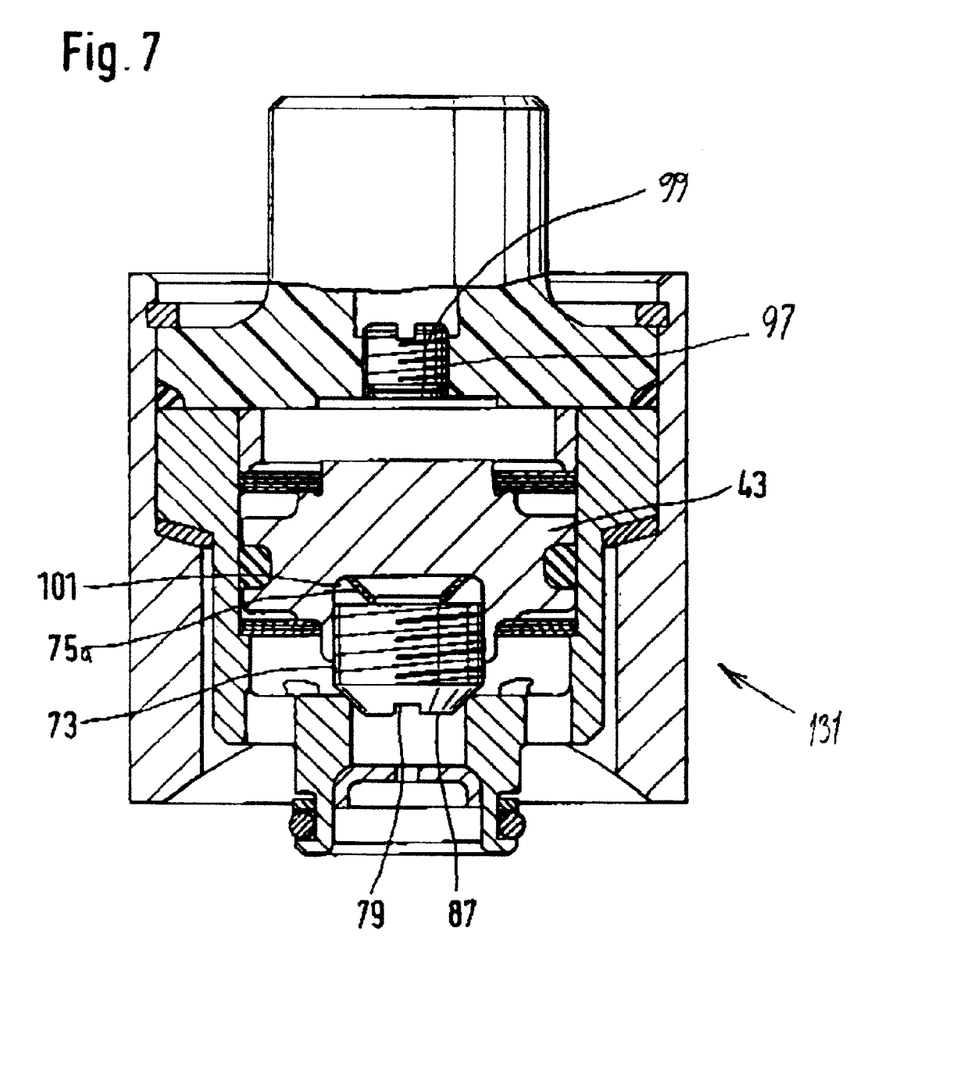

FIG. 7 shows an embodiment of a pressure dependent valve 131 that is similar to the pressure-dependent valve 130 of FIG. 6. The adjustment device 73 of the FIG. 7 embodiment comprises a blind hole opening 101 directly between the valve body 39 and the pressure transducer 43. The tool surface 79 for adjustment is located on the flow surface 87. The prestress spring 75 is a cup spring 75a held between the bottom of the blind hold opening 101 and the rear side of the valve body 39. Compared with FIG. 6, it is also possible to dispense with the valve body seal 39a between the valve body and the pressure transducer 43.

Figure 8:
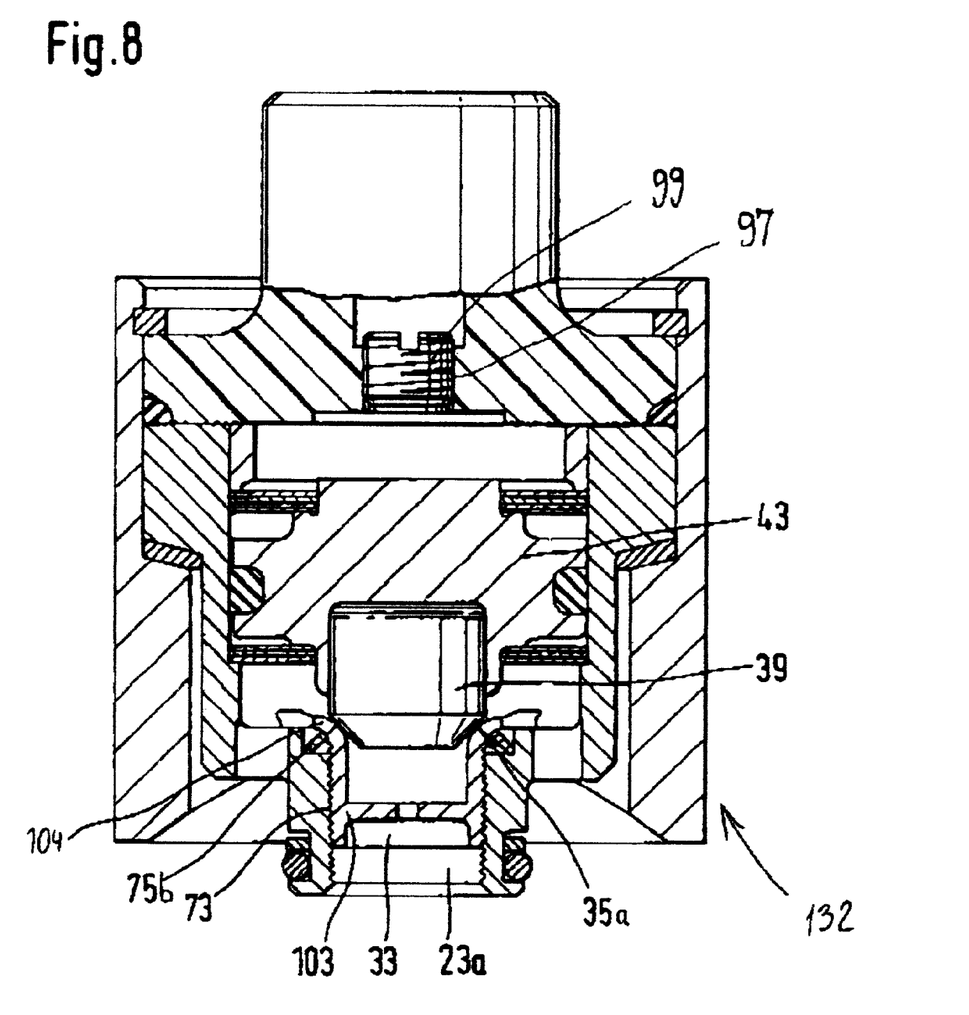

FIG. 8 shows an embodiment of a pressure-dependent valve 132 which shows that a valve surface 35a may also be adjusted relative to the pressure transducer 43 to determine the valve passage cross-section. To this end, the adjustment device 73a comprises the valve surface 35a as part of a screw socket 103. The threaded joint of the adjustment device 73a is embodied between the screw socket 103 and the connection 33. The screw socket 103 has a collar 104, on which the prestress spring 75b acts on the side away from the valve surface 35a, a bottom of the spring 7b rests on pot-shaped insert 31. The valve body 39 is fixed relative to the pressure transducer 43 by the operating pressure in the high-pressure segment 23a.

The illustrated pressure-dependent valves 27 and 128–132 are shown functioning as pressure-limiting valves and their application and design should be considered as examples only. According to German reference DE 44 24 347, the valve 27 is also conceivable as a pre-step valve with a blocking valve module as a substitute for a magnetically controlled valve . Furthermore, the valve 27 need not necessarily be controlled by a control line of a pneumatic spring purely on the basis of load. A separate supply of a pressure medium such as oil or air is also conceivable. Coordination of the spring forces of the first and second spring elements, and adjustment based on the adjustment device, allow the valve to be used universally for a wide pressure range.

The invention is not limited by the embodiments described above which are presented as examples only but can be modified in various ways within the scope of protection defined by the appended patent claims.

We claim:

1. The pressure-dependent valve for use with an adjustable vibration damper having a piston rod axially movable arranged in a fluid filled cylinder, the pressure-dependent valve comprising:

a plurality of valve parts for determining a valve passage cross-section including a valve surface and a valve body, wherein said valve body is axially movably mounted relative to said valve surface, a relative position of said valve body and said valve surface determining said valve passage cross-section;

a pressure transducer float mounted in a pressure space in said pressure-dependent valve and receiving a control pressure via a pressure connection opening for activating said valve body in response to said control pressure;

a spring supporting said pressure transducer; and an adjustment device comprising a threaded joint operatively connected for adjustably positioning one of said plural valve parts relative to a position of said pressure transducer, wherein said valve body comprises an extension and said pressure transducer comprises an opening, said extension of said valve body extending through said opening to a side of said pressure transducer facing away from said valve body, said adjustment device being arranged between said extension and said pressure transducer.

2. The pressure-dependent valve of claim 1, wherein said one of said plural valve parts comprises said valve body.

3. The pressure-dependent valve of claim 1, wherein said one of said plural valve parts comprises said valve surface.

4. The pressure-dependent valve of claim 1, wherein said adjustment device comprises a thread clearance compensation means.

5. The pressure-dependent valve of claim 4, wherein said thread clearance compensation means comprises a prestress spring operatively connected to said one of said plural valve parts.

6. The pressure-dependent valve of claim 1, further comprising an axially adjustable support surface, said spring supporting said pressure transducer being mounted on said support surface such that a prestress of the spring element is adjustable by changing a position of said axially adjustable support surface.

7. The pressure-dependent valve of claim 6, wherein said axially movable support surface comprises a support ring movably mounted in said pressure spaced.

8. The pressure-dependent valve of claim 7, further comprising a guide circumferentially surrounding said pressure space, wherein said support ring establishes a press fit with said guide inside said pressure space.

9. The pressure-dependent valve of claim 1, wherein said extension is centrally arranged relative to said pressure connection opening of said adjustment device, so that said extension is accessible through said pressure connection opening.

10. The pressure-dependent valve of claim 1, wherein said one of said plural valve parts comprises a tool surface.

11. The pressure valve of claim 9, wherein said extension extends into said pressure connection opening.

12. The pressure-dependent valve of claim 1, wherein said pressure space communicates with said pressure connection opening and said valve body comprises an extension and said pressure transducer comprises an opening, said extension of said valve body extending through said opening to a side of said pressure transducer facing away from said valve body, and said extension comprises a throttle inlet channel connecting said pressure connection opening to said pressure space.

13. The pressure-dependent valve of claim 12, wherein said throttle inlet channel in said extension opens to a threaded joint between said pressure transducer and said extension.

* * * * *